Feb. 3, 1959 G. D. CONLEE 2,871,871
WATER SUPPLY MEANS FOR WASHING MACHINES
Filed April 26, 1956 2 Sheets-Sheet 1
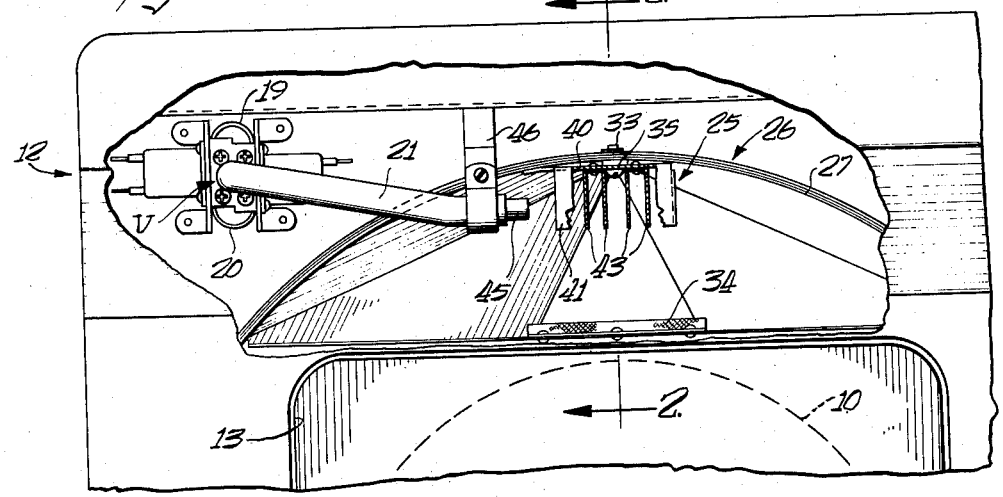
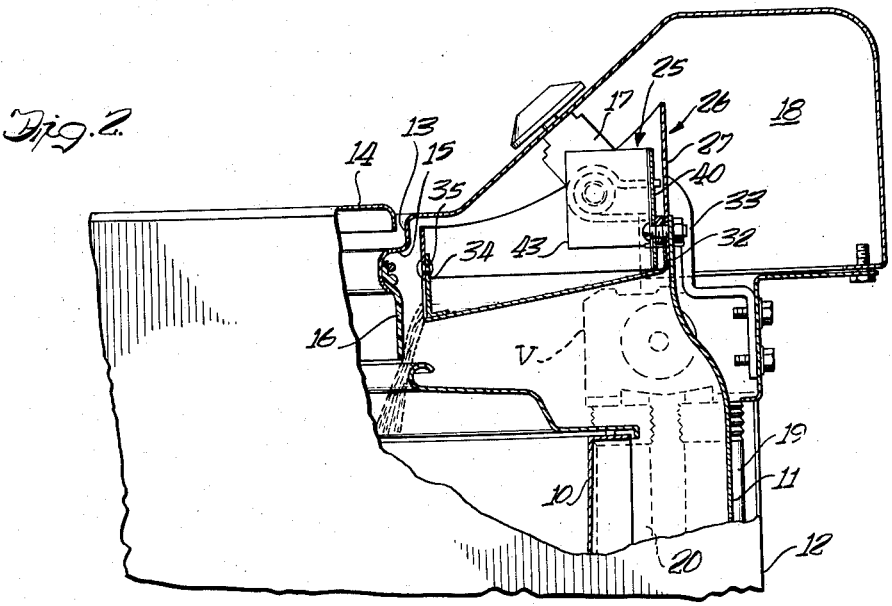
Inventor
George D. Conlee
By Carlson, Pitzner, Hubbard & Wolfe
Attorneys Feb. 3, 1959 G. D. CONLEE 2,871,871
WATER SUPPLY MEANS FOR WASHING MACHINES
Filed April 26, 1956 2 Sheets-Sheet 2
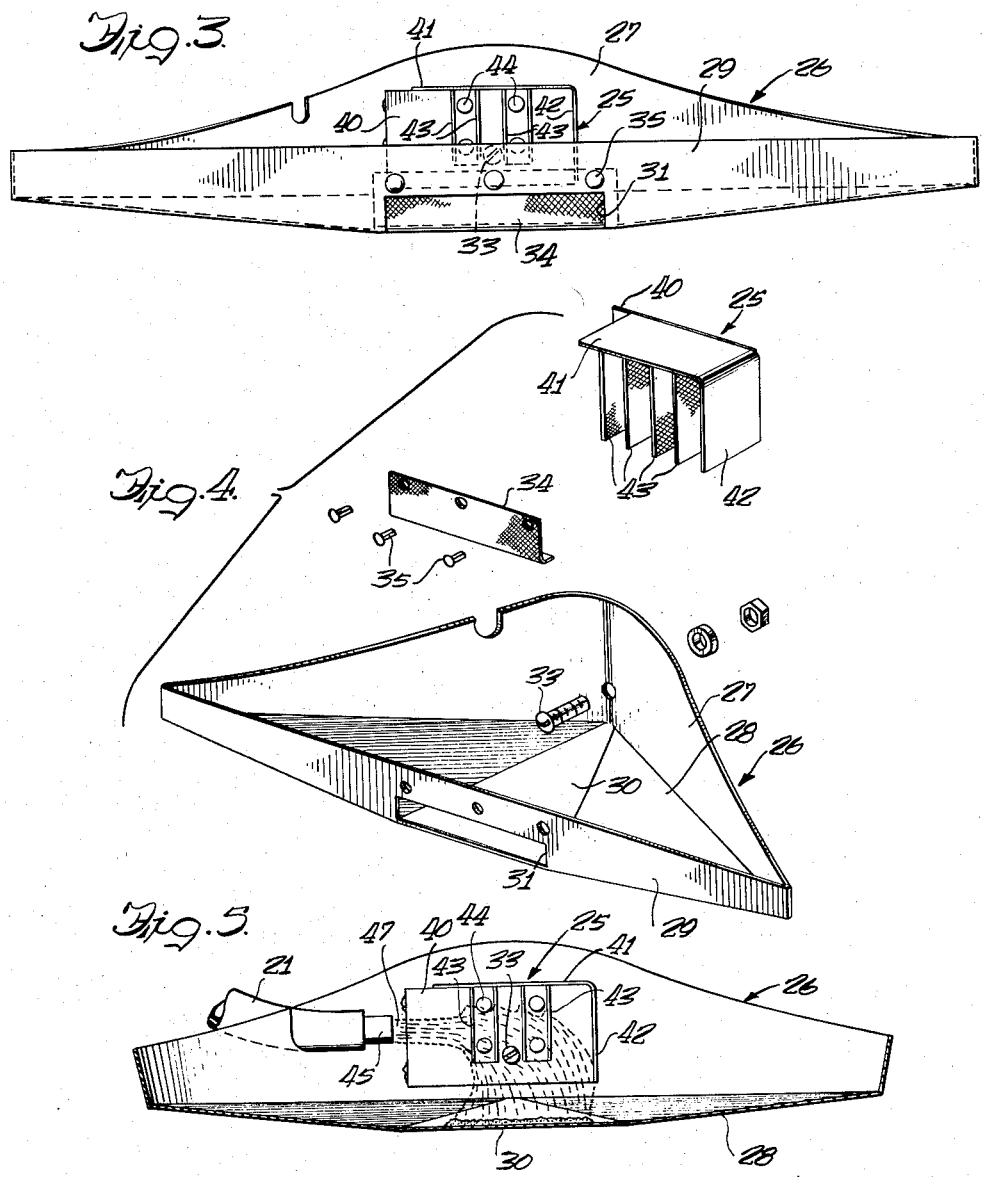
Inventor
George D. Conlee
By Carlson, Pitzner, Hubbard & Wolfe
Attorneys

United States Patent Office 2,871,871
Patented Feb. 3, 1959

2,871,871
WATER SUPPLY MEANS FOR WASHING MACHINES

George D. Conlee, Ripon, Wis., assignor, by mesne assignments, to McGraw-Edison Company, a corporation of Delaware Application April 26, 1956, Serial No. 580,749

3 Claims. (Cl. 137—216)

The invention relates to washing machines of the type in which the wash water is supplied under pressure and it is more particularly concerned with improved means for controlling the delivery of the water to the tub or the receptacle of the machine.

The invention is particularly well adapted, although not limited, to use with automatic washing machines. In such machines, both wash and rinse water are usually delivered to the tub at the highest pressure available from the service mains in order to minimize the filling time and thus avoid undue lengthening of the operating cycle. To insure complete solution and mixing of the detergent with the wash water, the usual practice is to place the detergent in the tub or receptacle before the water is turned on. Considerable trouble has been experienced with that mode of filling due to the formation of an excessive amount of suds which floats on the wash water. The floating suds, of course, perform no useful function in the washing operation and therefore represent a waste of detergent. An even more serious consideration is the interference of the suds with the mechanical action of the machine in the washing operation and other operations which follow it in the cycle.

I have found that excessive suds formation can be eliminated and a much larger portion of the detergent can be retained in the wash water where it is needed by dissipating the kinetic energy of the water stream and entrapping a substantial amount of air in the water before it is delivered to the tub. One object of this invention is to provide simple, yet effective, means for accomplishing that result.

More specifically stated, it is an object of the invention to provide in an automatic washing machine or the like water supplying means operative to dissipate the kinetic energy of the water supplied to the machine under pressure, to entrap air in finely divided bubbles in the water and to deliver the water to the tub or receptacle under gravity flow in a gentle stream which disperses the detergent through the water in creamy, small bubbles that tend to remain in the water rather than to rise and float on top.

Another object is to provide means for dissipating the kinetic energy of a jet of water and for areating the water which permits the machine to be filled in the usual time even when the energy dispersing elements become clogged up with debris or accumulate deposits of salts such as occurs with the use of hard water.

Other objects and advantages of the invention will become apparent from the following detailed description of the preferred embodiment illustrated in the accompanying drawings, in which:

Figure 1 is a fragmentary top view of a washing machine with parts broken away to show installed therein water supply means embodying the features of invention.

Fig. 2 is a fragmentary sectional view taken in a vertical plane substantially on the line 2—2 of Fig. 1.

Fig. 3 is a side elevational view of the water supply means removed from the machine.

Fig. 4 is an exploded perspective view of the water supply means.

Fig. 5 is a longitudinal sectional view through the pan of the water supply means showing the path of the water delivered thereto.

While a preferred form of the invention has been shown and will be described herein in detail, this is not intended to limit the invention to the particular construction illustrated but the intention is to cover all modifications, adaptations and alternative constructions falling within the spirit and scope of the invention as expressed in the appended claims.

By way of illustration, the invention has been shown as installed in a washing machine in which the washing action is carried out in an upright, open-topped tub or receptacle 10. The receptacle, in this instance, is mounted in an outer or splash tub 11 which is enclosed in a casing 12 having an access opening 13 in its top wall closed by a cover 14 when the machine is in operation. A downwardly turned flange 15 formed around the opening 13 carries a depending skirt 16 registering with the top opening in the receptacle 10 to prevent clothes or other fabrics from entering the splash tub.

The exemplary machine is designed for cyclic operation under automatic control by a timer 17 housed in a compartment 18 provided at the top of the casing 12. The timer, in addition to controlling the mechanical elements of the machine in the washing, rinsing and extracting phases of the cycle, also controls the delivery of the wash and rinse water to the receptacle 10. Such control is exercised through the medium of the valve means V disposed in the casing 12 below the compartment 18. Water is delivered to the valve means through hot and cold water pipes 19 and 20 extending vertically between the splash tub 11 and the casing 12 and having suitable fittings at their lower ends for connection with the usual service mains. Water from either pipe is discharged from the valve through a supply conduit 21 preferably of flexible material such as rubber or the like.

In carrying out the invention, I provide means for completely dissipating the kinetic energy of the water discharged in the form of a jet from the conduit 21 and for entraining a substantial amount of air in the water before it is delivered to the receptacle 10. This means comprises an energy dissipating and aerating device 25 positioned to intercept the jet of water as it emerges from the conduit 21. To insure complete dissipation of the kinetic energy of the water the supply means include a shallow, walled tray or pan structure 26 for collecting the water as it leaves the device and for delivering it to the receptacle under gravity flow in a smooth, calm stream.

While the pan 26 may be of any suitable shape and construction, the space available in the exemplary machine dictates the use of a generally triangular shape. As shown in Fig. 4, the pan is constructed of sheet metal with a back wall 27 extending along two sides of the triangular bottom 28 and tapering gradually from a high point at the apex to a low point at its junction with the front wall 29 which extends along the third side of the triangle. Preferably the bottom wall is sloped gradually from each edge of the back wall to merge into a depressed, generally triangular central section 30 which slopes downwardly from the apex toward the front wall. Adjacent the forward edge of the bottom section 30 the front wall is formed with an elongated, relatively narrow outlet opening 31.

In the exemplary embodiment of the invention, the pan 26 is supported in the compartment 18 above and at one side of receptacle 10. While the pan may be mounted in any preferred manner, it is shown herein as having its back wall secured to an upright extension 32 of the splash tub 11 by a bolt 33. The location of the extension and the dimensions of the pan are such that the edge of the pan adjacent the outlet 31 substantially overlies the open end of the receptacle 10 so that the water collected in the pan may be delivered by gravity flow direct to the receptacle. It will be understood, of course, that the pan may be located elsewhere, if desired, and the water delivered to the receptacle through suitable conduit means.

Preferably, the shape of the outlet 31 is such that the water flows from the pan in a wide, relatively shallow stream. To avoid turbulence and to maintain the flow at minimum velocity, the outlet may be equipped with a screen 34 of woven wire or other suitable material. As shown in Fig. 4, the screen 34 is secured to the front wall of the pan 26 as by rivets 35.

The energy dissipating and aerating device 25 may be of any preferred construction and may be supported in operative relation to the discharge end of the conduit 21 in any suitable manner. Preferably the device is spaced from the end of the conduit so that the water discharged from the conduit may flow freely into the pan, even though the device becomes clogged with debris or deposits of salts derived from the water. In the particular embodiment illustrated, the device comprises a generally rectangular sheet metal shield structure having three right-angularly related walls, namely, a rear wall 40, a top wall 41 and one end wall 42. This structure is suitably secured, in this instance, to the back wall of the pan by the bolt 33 with its open end facing the conduit 21 and its open side facing the front wall of the pan. The walls thus prevent splashing of water out of the pan and into the compartment in which it is mounted.

Secured within the shield structure are a series of flat, rectangular foraminate members 43 which may be made of relatively stiff woven fabric of wire or other suitable material. Preferably, the members are disposed in parallel relation to the end wall 42 of the shield and are suitably spaced from each other and from the discharge end of the conduit 21. As shown, the members are formed from elongated rectangular strips of the woven material bent into U-shaped configuration so that each strip defines two of the foraminate members. These U-shaped units may be secured to the back wall 40 of the shield structure by rivets 44 or other suitable fasteners inserted through holes in the web connecting the paired members.

As shown in Fig. 5, the conduit 21 is equipped with a nozzle 45 and is supported by a bracket 46 (Fig. 1) so as to discharge water in a solid stream or jet 47 generally horizontally into the shield structure and against the foraminate members 43. Thus, the foraminate members are positioned to intercept the jet and act to break it up into a multiplicity of finely divided streams. Accordingly, the members 43 dissipate substantially all of the kinetic energy of the water jet and at the same time entrain a substantial quantity of air in the water in the form of small bubbles. The shield walls 40, 41 and 42 prevent objectionable splashing of water and direct the water downwardly into the pan 26 where it collects quietly to flow by gravity through the outlet 31 to the receptacle 10.

By dissipating the kinetic energy of the water jet in the pan 26 as above described, the water is delivered to the receptacle 10 with much less turbulence than is the case when the jet stream is discharged directly into the receptacle as is customary in washing machines as heretofore constructed. This gentle flow of water having only the small velocity resulting from its short fall from the pan 26, coupled with the thorough aeration of the water, disperses the detergent through the water in small, creamy bubbles that tend to remain entrained in the water rather than floating to the top. Excessive floating suds with their deleterious action on the mechanical operation of the machine are thus eliminated. Furthermore, the detergent is kept in the water where it belongs so that the fullest use may be made of its detergent action and the washing operation carried on with high efficiency. It has also been found that aeration of the water appears to freshen it so that the clothes washed in a receptacle filled in the manner contemplated by the invention have a cleaner, fresher smell.

The spacing of the energy dissipating device 25 a substantial distance from the discharge end of the conduit 21, coupled with the open side and bottom construction of the shield, insures proper filling of the receptacle in each operating cycle, even if the foraminate members 43 should become completely clogged with debris or salt deposits. The latter condition may occur after a period of use in areas where the water is hard or carries a substantial quantity of salts in solution. Even under such conditions, the major portion of the kinetic energy of the water is dissipated before delivery to the receptacle 10 and some aeration of the water is effected. The full efficiency of the device 25 may be quickly and easily restored by removal of the deposits from the foraminate members. If cleaning is not practical, the energy dissipating device, which is in the form of a simple, inexpensive unit, can be removed and replaced by a new one with little effort or expense.

I claim as my invention:

1. In a washing machine having a washing receptacle, water supply means comprising, in combination, a pan structure supported above the receptacle, a conduit positioned to discharge a jet of water substantially horizontally into said pan, a vertically disposed foraminate member supported in spaced relation to the discharge end of said conduit in a position to intercept the jet and dissipate substantially all of its kinetic energy, a shield structure having an end wall disposed parallel to said member and at the side opposite said jet and a side wall and a top wall extending from the end wall to the vicinity of said conduit, said shield structure being open at the bottom to allow the water to fall freely into said pan, and said pan having an outlet for delivering the water by gravity flow to the receptacle.

2. In a washing machine having a washing receptacle, water supply means comprising, in combination, a pan structure supported above the receptacle, a conduit positioned to discharge a jet of water substantially horizontally into said pan, a vertically disposed foraminate member supported in spaced relation to the discharge end of said conduit in a position to intercept the jet and dissipate substantially all of its kinetic energy, a shield structure enclosing said member on at least three sides and open at the bottom to permit free passage of the water into said pan, said pan having an outlet for delivering water by gravity flow to the receptacle.

3. In a washing machine having a washing receptacle, water supply means comprising, in combination, a pan structure supported above the receptacle, a conduit positioned to discharge a jet of water substantially horizontally into said pan, a shield structure having an upright back wall, a horizontal top wall and one upright end wall, a vertically disposed foraminate member supported on the back wall of said shield structure between said end wall and said conduit and in spaced relation to the discharge end of said conduit in a position to intercept the jet and dissipate substantially all of its kinetic energy, said shield structure being open at the bottom to allow the water to fall freely into said pan, and said pan having an outlet for delivering the water by gravity flow to the receptacle.

References Cited in the file of this patent

UNITED STATES PATENTS

| | | |
|---|---|---|
| 363,120 | Cummings | May 17, 1887 |
| 2,180,310 | Myrick | Nov. 14, 1939 |
| 2,483,163 | Warren | Sept. 27, 1949 |
| 2,498,179 | Oliver | Feb. 21, 1950 |
| 2,561,257 | Woodson | July 17, 1951 |
| 2,631,448 | Garman | Mar. 17, 1953 |
| 2,635,446 | Smith | Apr. 21, 1953 |
| 2,712,748 | Edwards | July 12, 1955 |
| 2,775,486 | King | Dec. 25, 1956 |